(12) United States Patent
Wang

(10) Patent No.: US 7,853,388 B2
(45) Date of Patent: Dec. 14, 2010

(54) DEVICES, SYSTEMS, AND METHODS FOR CONTROLLING A BRAKING SYSTEM

(75) Inventor: Xiaobin Wang, Alpharetta, GA (US)

(73) Assignee: Siemens Industry, Inc., Alpharetta, GA (US)

(*) Notice: Subject to any disclaimer, the term of this patent is extended or adjusted under 35 U.S.C. 154(b) by 965 days.

(21) Appl. No.: 11/710,299

(22) Filed: Feb. 23, 2007

(65) Prior Publication Data

US 2007/0233351 A1 Oct. 4, 2007

Related U.S. Application Data

(60) Provisional application No. 60/776,100, filed on Feb. 23, 2006.

(51) Int. Cl.
  G06F 7/00 (2006.01)
  G06F 17/00 (2006.01)
  G05D 1/00 (2006.01)
  B60T 7/12 (2006.01)

(52) U.S. Cl. .................. 701/81; 701/1; 701/22; 701/36; 701/48; 701/50; 701/71; 701/74; 701/78; 701/79; 701/82; 701/83; 701/84; 701/85; 701/90; 701/91

(58) Field of Classification Search .................. None
See application file for complete search history.

(56) References Cited

U.S. PATENT DOCUMENTS

| | | | |
|---|---|---|---|
| 4,717,207 A * | 1/1988 | Kubota et al. ............. 303/3 |
| 5,040,648 A | 8/1991 | Mitchell et al. |
| 5,351,775 A | 10/1994 | Johnston et al. |
| 5,769,752 A * | 6/1998 | Kim ......................... 477/114 |
| 5,820,515 A * | 10/1998 | Fukaya et al. ............. 477/92 |
| 5,983,149 A | 11/1999 | Tate et al. |
| 6,150,780 A | 11/2000 | Young et al. |
| 6,249,733 B1 | 6/2001 | Smith |
| 6,278,916 B1 * | 8/2001 | Crombez ................... 701/22 |
| 6,299,623 B1 | 10/2001 | Uematsu et al. |
| 6,349,253 B1 | 2/2002 | Bellinger |
| 6,590,299 B2 * | 7/2003 | Kuang et al. ............. 290/40 C |
| 6,616,572 B2 * | 9/2003 | Suzuki ..................... 477/86 |
| 6,819,995 B2 | 11/2004 | Bellinger |
| 6,994,407 B2 | 2/2006 | Kinder et al. |
| 7,034,476 B2 | 4/2006 | Wang et al. |
| 7,041,031 B2 | 5/2006 | Wheeler et al. |
| 2003/0214185 A1 | 11/2003 | Kinder et al. |

* cited by examiner

Primary Examiner—Khoi Tran
Assistant Examiner—Bhavesh V Amin
(74) Attorney, Agent, or Firm—Filip A. Kowalewski

(57) ABSTRACT

Certain exemplary embodiments comprise a method, which can comprise automatically setting a service brake of a mining haulage vehicle. The service brake can be set responsive to a determination that a wheel comprising a wheel motor is rotating at a rotational speed that is above a predetermined rotational speed. In certain exemplary embodiments, the service brake can be automatically released.

20 Claims, 3 Drawing Sheets

DEVICES, SYSTEMS, AND METHODS FOR CONTROLLING A BRAKING SYSTEM

CROSS-REFERENCES TO RELATED APPLICATIONS

This application claims priority to, and incorporates by reference herein in its entirety, U.S. Provisional Patent Application Ser. No. 60/776,100, filed 23 Feb. 2006.

BACKGROUND

For machine applications, such as mining truck applications, an operator can monitor an actual moving direction of a machine and compare it with a reference direction. When the actual direction differs, a relatively rapid reduction in machine translational velocity might be desired. An operator might monitor the machine and use a service brake to reduce the translational velocity of the machine. Such a method might encounter difficulties in resuming machine motion if the truck is loaded and/or positioned on a sloped terrain. Therefore certain exemplary embodiments can be adapted to identify and attempt to resist rollback of machines.

U.S. Pat. No. 6,994,407 (Kinder), which is incorporated by reference herein in its entirety, allegedly discloses, "a method and a device for controlling braking equipment of a motor vehicle. Here, an operating state of a motor vehicle is determined, in which the motor vehicle is to be brought from a state, in which its speed is not zero, into a state, in which the vehicle no longer moves. If such a transition from a traveling state into a state of standstill is determined, braking equipment of the motor vehicle is controlled such that braking forces are produced, which are capable of bringing the motor vehicle into the state of standstill and/or assisting a vehicle driver in doing this. It is also possible to produce braking forces in the state of standstill, which are capable of holding the motor vehicle in the state of standstill. The present invention additionally enables to assist a vehicle driver when starting a motor vehicle. In this case, an operating state of the motor vehicle is detected in which the motor vehicle is to be brought from a state of standstill into a traveling state. If such an operating state is present, the braking equipment of the motor vehicle is controlled such that the braking forces produced by the braking equipment in the state of standstill are reduced in such a way as to allow a transition into the traveling state and/or to assist the vehicle driver in this respect." See Abstract.

U.S. Pat. No. 6,819,995 (Bellinger), which is incorporated by reference herein in its entirety, allegedly discloses, "[a] system for controlling vehicle braking operation includes a mechanism for determining desired service brake force, a mechanism for determining vehicle deceleration, an electronically actuatable engine compression brake unit, an electronically controllable turbocharger boost pressure adjustment device and a transmission including a number of automatically selectable gear ratios, wherein each of these components are coupled to a control computer. The control computer is operable to activate the engine compression brakes whenever service brake action is detected, and to modulate the downshift engine speed points of the transmission as a function of the desired brake force. The boost pressure adjustment device and the engine compression brake may optionally be controlled to maintain a vehicle deceleration rate below a deceleration rate threshold. Alternatively, the downshift engine speed points may be controlled to maintain the vehicle deceleration rate below the deceleration rate threshold." See Abstract.

U.S. Pat. No. 7,041,031 (Wheeler), which is incorporated by reference herein in its entirety, allegedly discloses, "a method for calculating a modification to the predetermined amount of torque needed to provide an urge to move sensation for a vehicle, the modification to take account of the weight at which and gradient on which the vehicle is operating and then commanding the engine to generate said modified torque and to transmit the modified urge torque to a clutch device to provide the urge to move according to the current operating conditions." See Abstract.

SUMMARY

Certain exemplary embodiments comprise a method, which can comprise automatically setting a service brake of a mining haulage vehicle. The service brake can be set responsive to a determination that a wheel comprising a wheel motor is rotating at a rotational speed that is above a predetermined rotational speed. In certain exemplary embodiments, the service brake can be automatically released.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
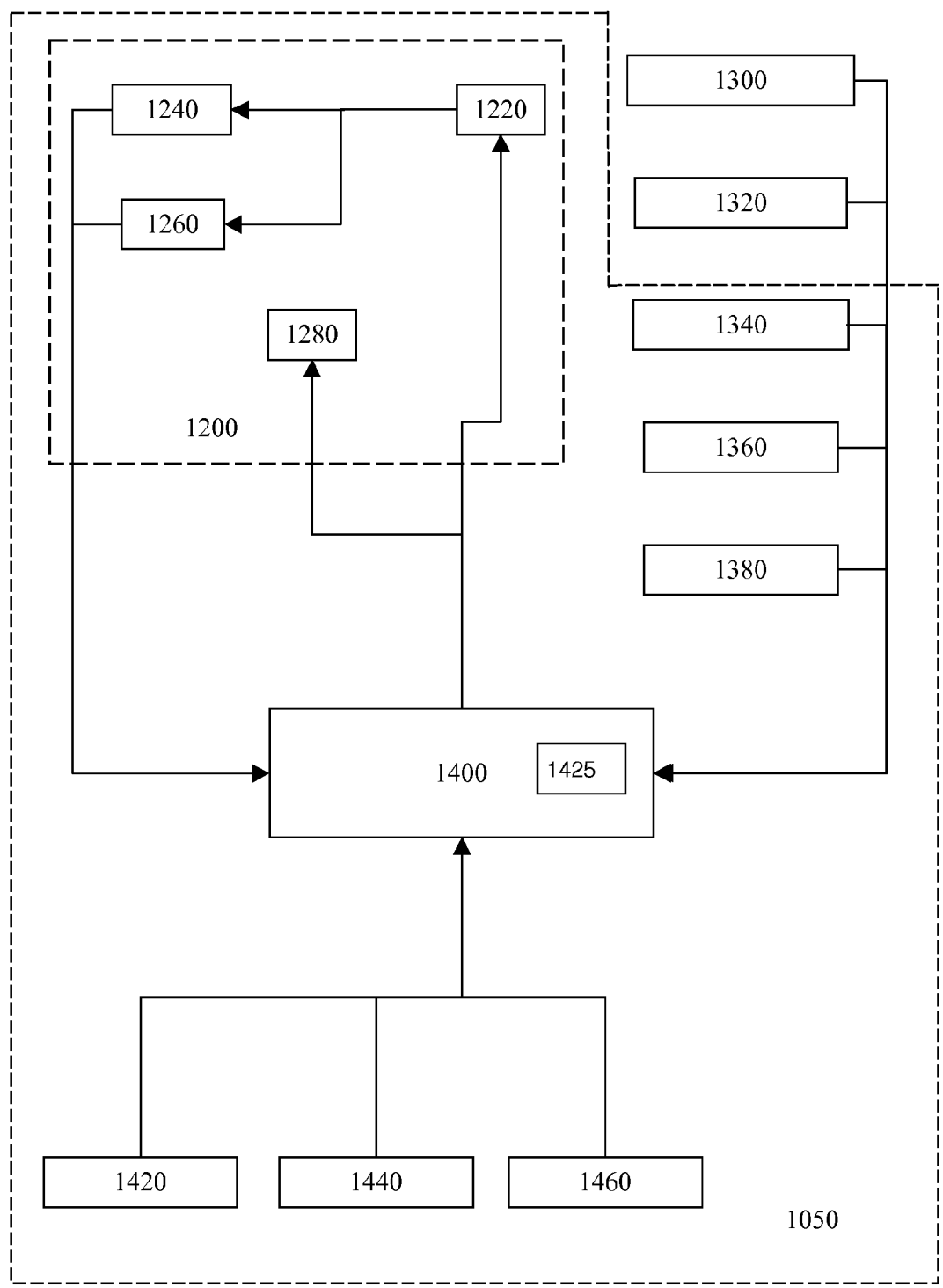
FIG. 1 is a block diagram of an exemplary embodiment of a system 1000.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

above—at a higher level, e.g. the session layer, the presentation layer, and the application layer are above the transport layer in the OSI model.

activity—an action, act, deed, function, step, and/or process and/or a portion thereof.

actual—real, realized, and/or existing; not merely potential or possible; based in reality; and/or measurable.

adapted to—suitable, fit, and/or capable of performing a specified function.

and/or—either in conjunction with or in alternative to.

apparatus—an appliance or device for a particular purpose.

associated with—related to.

at least—not less than.

automatically—acting and/or operating in a manner essentially independent of external human influence and/or control. For example, an automatic light switch can turn on upon "seeing" a person in its view, without the person manually operating the light switch.

based upon—determined in consideration of and/or derived from.

can—is capable of, in at least some embodiments.

cause—to bring about, provoke, precipitate, produce, elicit, be the reason for, result in, and/or effect.

comprises—includes, but is not limited to, what follows.

comprising—including but not limited to, what follows.

controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.

data—distinct pieces of information, usually formatted in a special or predetermined way and/or organized to express concepts.

desired—indicated, expressed, and/or requested.

determination—an act of making or arriving at a decision.

determine—to obtain, calculate, decide, deduce, and/or ascertain.

device—a machine, manufacture, and/or collection thereof.

direction—a spatial relation between something and a course along which it points and/or moves; a distance independent relationship between two points in space that specifies the position of either with respect to the other; and/or a relationship by which the alignment and/or orientation of any position with respect to any other position is established.

direction of travel—a distance-independent angular measure of transverse motion of an object relative to a point of reference.

each—every one of a group considered individually.

estimate—to calculate and/or determine approximately and/or tentatively.

exceeds—is greater than.

further—in addition.

gear ratio—a proportional relation of an input rotational speed and an output rotational speed of a power transmission device and/or system.

Geographic Information System (GIS)—an information management system tied to geographic data. For example, a GIS can comprise various types of geographical data sets, such as topography, elevation, buildings, hydrology, road networks, urban mapping, land cover, zoning, and/or demographic data, etc. Data sets in a GIS can be tied together geographically to provide a spatial context.

Global Positioning System (GPS)—a system adaptable to determine a terrestrial location of a device receiving signals from multiple satellites.

gross vehicle weight—a total weight of a mobile machine, including passengers, fuel, cargo, and/or attachments, etc.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard real time—relating to a system (or sub-system) having activities with hard deadlines, and a sequencing goal of always meeting all those hard deadlines. A system operating in non-real time or soft real time can suffer a critical failure if time constraints are violated. A classic example of a hard real-time computing system is an automobile engine electronic valve timing control system, in which an overly delayed or overly advanced control signal might cause engine failure or damage, due to one or more valve-piston collisions. Systems operating in hard real time typically utilize instructions embedded in hardware and/or firmware incline—a slope with respect to a horizontal plane.

inclinometer—an instrument for indicating the inclination of a vehicle.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function. Can be implemented as firmware and/or software.

less than—having a measurably smaller magnitude and/or degree as compared to something else.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

mine haulage vehicle—a motorized machine adapted to transport bulk earthen materials.

monitor—to observe.

motor—a device that converts electrical energy into mechanical energy to turn a shaft.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

obtaining—the act of receiving, calculating, determining, or computing.

one—a single entity.

opposing—opposite; against; being the other of two complementary or mutually exclusive things; placed or located opposite, in contrast, in counterbalance, and/or across from something else and/or from each other.

plurality—the state of being plural and/or more than one.

position—(n) a place and/or location, often relative to a reference point. (v) to place and/or locate.

predetermined—determine, decide, or establish in advance.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

propel—to cause to move forward and/or backward.

propel torque—a moment of a force adapted to cause a machine to move.

receive—to get as a signal, take, acquire, and/or obtain.

release—to let go and/or free from something that restrains, binds, fastens, and/or holds back.

release—to let go and/or free from something that restrains, binds, fastens, and/or holds back.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

required—necessary and/or essential.

resist—to avoid, act, and/or remain firm against and/or in opposition to the actions, effects, and/or force of.

responsive—reacting to an influence and/or impetus.

rolling resistance—a motion resisting force caused by friction between a machine and a surface with which the machine is in contact.

rotate—to turn about an axis.

rotational speed—a velocity at which an object turns around a center or an axis. A rotational speed can be expressed in terms of a number of revolutions in a given time period.

said—when used in a system or device claim, an article indicating a subsequent claim term that has been previously introduced.

service brake—a mechanical device adapted to restrain a motion of a machine.

set—to put into a condition for use.

signal—information, such as machine instructions for activities, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

store—to place, hold, and/or retain data, typically in a memory.

stored—placed, held, and/or retained in a memory.

substantially—to a great extent or degree.

system—a collection of mechanisms, devices, data, and/or instructions, the collection designed to perform one or more specific functions.

terrain—surface features of an area of land.

threshold—a point that when exceeded produces a given effect or result.

throttle—a device and/or system that regulates a supply of fuel to an engine.

tire radius—a distance from an outer perimeter of a tire to a center of rotation of the tire.

translational—along a linear and/or curvilinear path; non-rotational.

travel—to move from a first location to a second location.

traverse—to travel over.

undesired—not indicated, not expressed, and/or not requested.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

velocity—a translational speed.

via—by way of and/or utilizing.

weight—a force with which a body is attracted to Earth or another celestial body, equal to the product of the object's mass and the acceleration of gravity; and/or a factor assigned to a number in a computation, such as in determining an average, to make the number's effect on the computation reflect its importance.

wheel—a solid disk or a rigid circular ring connected to a hub and designed to turn around an axle.

wheel drive system—a plurality of components by which power is transmitted from an energy source, such as a fossil-fuel powered internal combustion engine, to the wheels of a machine. A wheel drive system can comprise, for example, an engine; a generator and/or alternator; an electric motor; a speed sensor; a torque sensor; a plurality of mechanical power transmission components, such as a clutch, torque converter, transmission, driveshaft, differential, and/or gearbox, etc.; a system controller; an inverter; a variable frequency motor controller; an electrical braking system adapted to generate power from the machine as it retards; and/or an electrical energy dissipation circuit associated with the electrical braking system; etc.

DETAILED DESCRIPTION

Certain exemplary embodiments provide a method, which can comprise automatically setting a service brake of a mining haulage vehicle. The service brake can be set responsive to a determination that a wheel comprising a wheel motor is rotating at a rotational speed that is above a predetermined rotational speed. In certain exemplary embodiments, the service brake can be automatically released.

In order to provide large vehicles, such as trucks, anti-roll back protection and promote easeful driving again on a slope, certain exemplary embodiments provide a system and method for anti-rollback control utilizing machine weight and inclinometer information. Certain exemplary embodiments can monitor a roll back condition in hard real time and/or apply a service brake automatically responsive to a signal of an information device. Hardware, firmware, and/or software can utilize vehicle weight information and/or inclinometer information to calculate an amount of propel torque desired to resist a machine, such as a truck, from rolling in an undesired direction before a service brake of the machine is released. Certain exemplary embodiments can improve control over machines, such as trucks, so that an operator can have relatively good control over the machine.

In certain exemplary embodiments, a monitor of actual speed can comprise two rotational speed sensors, one for each of two wheel motors. The rotational speed sensors can monitor a rotating speed and/or direction of a wheel motor shaft. Machine weight information can be obtained from a weight sensor and/or machine weighing system. In certain exemplary embodiments the weight system can be provided by an original equipment manufacturer (OEM). A grade signal inclinometer can be installed to obtain terrain information in proximity to the machine, such as a grade on which the machine is currently located. A processor and/or information device can be adapted to calculate a speed and/or cause a signal to be sent to set the service brake when the machine travels in an undesired direction. The processor and/or information device can be adapted to calculate a desired propel torque prior to releasing the service brake. The desired propel torque can be based upon machine weight information and/or from a truck gross vehicle weight (GVW) and/or information regarding the grade where the machine is currently located.

The processor and/or information device can monitor for a condition wherein the machine is moving in an undesired direction at a measured translational velocity of the machine and/or a measured rotational speed of a wheel of the machine. Responsive to a determination that the machine is moving in the undesired direction and that the rotational speed of the wheel of the machine exceeds a predetermined rotational speed threshold and/or the translational velocity of the machine is less than a translational velocity threshold, the processor and/or information device can set a roll back logic bit active. The predetermined rotational speed threshold can be any rotational speed, such as, in rpm, 1, 1.8, 2.43, 5, 8.1, 10, 12, 14.6, 19, 21.7, 29.9, and/or any value or subrange therebetween, etc. The roll back logic bit can be adapted to cause the service brake to be set if the truck speed is less than the predetermined translational velocity threshold. The predetermined translational velocity threshold can be any translational velocity, such as, in mph, 0.2, 1, 1.7, 2.5, 4.9, 5, 6.1, 8.3, 12.4, 15, and/or any value or subrange therebetween, etc. In an embodiment of the present invention, the control signal for a service brake solenoid adapted to set the service brake can be a pulse width modulated (PWM) signal. A duty cycle of the PWM signal can be adjusted if the service brake solenoid is of a proportional style. Such an adjustment might resist a tendency of the machine to jerk.

After the service brake is set by a roll-back condition, in an embodiment, propel torque can be increased to a predetermined level before the service brake is released. Such an embodiment can be adapted to resist a motion of the machine in the undesired direction. In order to enable the machine to start relatively smoothly, the propel torque can be applied in excess of a threshold propel torque. The threshold propel torque can be based upon an actual machine gross weight and the grade where machine is located. However, setting the threshold propel torque at an excessive level might tend to cause the machine to jump or jerk. In certain exemplary embodiments, the threshold propel torque can be calculated via an equation:

$$\text{Threshold propel torque} = GVW*9.8*\text{Sin}(\text{Tan}(\text{Grade})+RR))*TR/1000/GR$$

where:
GVW is a gross machine weight (e.g., in kilograms);
Grade is a slope, such as a slope obtained from an inclinometer (e.g., in percentage units);
RR is a frictional resistance between the machine and a surface in contact with the machine (e.g., in percentage units);
TR is a tire radius of the machine (e.g., in meters); and
GR is a gear ratio of a power transmission device associated with the machine (e.g., a ratio of gears between a wheel motor shaft and a tire).

The processor and/or information device can be adapted to monitor a throttle position of the machine and can be adapted to release the service brake when an estimated and/or actual propel torque to the wheel motor is greater than the threshold propel torque.

Certain exemplary embodiments can comprise a speed sensor for each wheel motor. The speed sensor can monitor a rotational speed and direction of an associated wheel motor shaft. The processor and/or information device can calculate the rotational speed of each wheel and can cause the service brake to be set when the machine is traveling in the undesired direction. The processor and/or information device can calculate the threshold propel torque to be built up to prior to causing a release of the service brake.

Certain exemplary embodiments can enable an operator of the machine to start machine movement with the machine positioned on a slope. For example, the left hand of the operator can control a steering wheel and the right foot can control a throttle pedal. Certain exemplary embodiments can comprise an information device adapted to automatically set the service brake and/or automatically calculate the threshold propel torque at which to release the service brake.

Certain exemplary embodiments can monitor machine motion in hard real time and apply the service brake automatically. Hardware, firmware, and/or software can obtain weight information and slope information, such as from the inclinometer, to calculate the threshold propel torque.

Certain exemplary embodiments can automatically detect that the machine is moving in the undesired direction at a relatively low speed and automatically set the service brake at the relatively low speed to resist motion of the machine in the undesired direction. In certain exemplary embodiments, the service brake can be worn more rapidly if applied when the machine is moving at a relatively high speed. In certain exemplary embodiments, the machine weight can be over one million pounds.

FIG. 1 is a block diagram of an exemplary embodiment of an automatic power control and braking system 1000, which can comprise a machine 1050. Machine 1050 can be, for example, a car, truck, locomotive, excavator, rail car, end loader, and/or a mining haulage vehicle (e.g., a mining haul truck), etc. In certain exemplary embodiments, machine 1050 can comprise a wheel drive system 1200, which can be a single wheel drive system driving a plurality of wheels of the machine. In certain exemplary embodiments, wheel drive system 1200 can be one of a plurality of wheel drive systems driving, each of which can drive one or more wheels of the machine.

Wheel drive system 1200 can comprise a motor 1220, which can be an alternating current electric motor and/or a direct current electric motor. Motor 1220 can have performance characteristics such as a relationship between a rotational speed and a torque, such as the angular speed and torque of a rotor and/or output shaft of the motor. A curve can be plotted for motor 1220 relating rotational speed to torque. The velocity of machine 1050 can be controlled via controlling a torque associated with motor 1220 and/or a service brake 1280. Applying a retarding torque and/or power via motor 1220 can provide an opposing torque and/or power to a velocity and/or direction of travel of machine 1050. Applying a retarding torque to machine 1050 can control and/or attempt to be control the velocity of machine 1050, particularly when machine 1050 traverses a downward grade. Applying service brake 1280 can restrain machine 1050 from translational motion. Applying a propel torque can cause motor 1220 to maintain and/or accelerate a velocity of machine 1050.

A shaft associated with motor 1220 can be coupled to a rotational speed sensor 1240, which can be adapted to provide a rotational frequency and/or angular speed of the shaft. Rotational speed sensor 1240 can be adapted to directly or indirectly measure an actual rotational speed of motor 1220. Rotational speed sensor 1240 can be coupled to motor 1220 mechanically, electro-mechanically, magnetically, and/or optically, etc. For example, a direct contact rotational speed sensor 1240 can sense signals from magnetic brushes to provide a measurement of rotational speed. As another example, an indirect contact rotational speed sensor 1240 can sense an optical signal reflected off of a surface to provide a measurement of rotational speed. Rotational speed sensor 1240 can detect, measure, and/or transmit a speed measurement related to motor 1220 to an information device 1400. The rotational speed associated with motor 1220 can be proportional to a power applied to hold and/or move machine 1050. In certain exemplary embodiments, rotational speed sensor 1240 can measure a rotational speed of a component of wheel drive system 1200 that is driven by motor 1220, and/or a translational (e.g., linear, curvilinear, etc.) speed of machine 1050.

The translation speed of machine 1050 represents a rate of change in position of machine 1050 in a direction of travel relative to a reference point over a predetermined time interval. The translation speed can be measured via a translational velocity sensor 1300, which can be comprised by system 1000 and/or machine 1050. The translation speed can be reported in, for example, feet per second, kilometers per hour, and/or miles per hour, etc. The rotational speed of a component of wheel drive system 1200 can be a rate at which the component rotates in a predetermined time and/or an angular speed of the component representing a rate of change in a rotational position of the shaft relative to a reference point over a predetermined period of time. The rotational speed can be reported in, for example, revolutions per second, revolutions per minute, revolutions per hour, degrees per second, degrees per minute, radians per second, and/or radians per minute, etc. The translation speed associated with a linear and/or curvilinear motion of machine 1050 can be converted to the rotational speed and vice versa.

System 1000 can comprise a torque sensor 1260, which can measure a torque related to motor 1220. For example, torque sensor 1260 can measure torque utilizing a strain gauge, an angular accelerometer, a dynamometer, and/or by measuring an electrical property such as a two-phase current transformation in conjunction with a two-phase flux transformation to calculate instantaneous torque, frequency, slip-speed, and/or phase shift, etc. Torque sensor 1260 can detect, measure, and/or transmit information indicative of a torque related to motor 1220 to information device 1400. The torque associated with motor 1220 can be considered as proportional to a force applied to hold and/or move machine 1050. The torque associated with motor 1220 can be proportional to the power applied to hold and/or move machine 1050. In certain exemplary embodiments, torque sensor 1260 can measure a torque applied to a component of wheel drive system 1200 that is driven by motor 1220, and/or a translation (e.g., linear) force of machine 1050.

An inclinometer 1360 can be comprised by and/or in machine 1050 and/or system 1000. Inclinometer 1360 can be adapted to measure an angle of incline associated with machine 1050. Inclinometer 1360 can provide information indicative of machine 1050 traversing a gradient such as a downhill gradient or an uphill gradient. Inclinometer 1360 can measure a slope via a device based on an accelerometer, capacitance, electrolysis; gas bubble in liquid, mercury, and/or pendulum, etc. Accelerometers can measure, display, and/or analyze acceleration and vibration associated with a gradient related to machine 1050. Capacitive tilt sensors can take non-contact measurements of tilt and inclination of machine 1050. Electrolytic tilt sensors can produce pitch and roll measurements related to machine 1050. A gas bubble in liquid can be comprised of a sight glass filled with liquid adapted to measure an incline associated with machine 1050. A mercury type tilt sensor can comprise a small metal or glass can, inside of which are two electrodes and a minute drop of mercury adapted to measure an incline associated with machine 1050. A pendulum type sensor can comprise a pendulum or weight in conjunction with a rotary sensor adapted to measure an incline associated with machine 1050. In certain exemplary embodiments, an inclinometer, such as a laser-based optical inclinometer, can be positioned outside machine 1050 to determine the incline of machine 1050 and/or any portion thereof.

In certain exemplary embodiments, inclinometer 1360 can be adapted to wirelessly obtain information related to the incline of machine 1050. For example, inclinometer 1360 can obtain information indicative of location from a GPS-based device and/or a GIS device, etc. Inclinometer 1360 can obtain information indicative of terrain slopes from an engineering entity, the USGS, and/or a commercial surveying entity, etc. Inclinometer 1360 can be communicatively coupled to information device 1400. Information measured, obtained, and/or determined using inclinometer 1360 can be wirelessly transmitted to at least one transceiver.

A weight sensor 1380 can be comprised by and/or in machine 1050 and/or system 1000. Weight sensor 1380 can be adapted to detect a weight related to machine 1050. Weight sensor 1380 can be a strain gauge, load cell, nuclear based weight sensor, and/or electrical sensor detecting a parameter related to weight, etc. Weight sensor 1380 can be communicatively coupled to information device 1400. In certain exemplary embodiments, a weight sensor 1380, such as a traditional scale, can be positioned outside machine 1050 to determine the weight of machine 1050 and/or any portion thereof. In certain exemplary embodiments, weight sensor 1380 can be adapted to wirelessly obtain information related to the weight of machine 1050. Information measured, obtained, and/or determined using weight sensor 1380 can be wirelessly transmitted to at least one transceiver.

Motor 1220 can be controllable via information device 1400, which can be adapted to, responsive to a plurality of inputs and/or conditions, control the propel torque and/or power, retard torque and/or power, and or service brake 1280 of machine 1050.

Information device 1400 can calculate an actual propel torque and/or power from measurements provided by, for example, a throttle sensor 1440, rotational speed sensor 1240 and torque sensor 1260. Information device 1400 can calculate propel torque and/or power on a discrete and/or time averaged basis. Information device 1400 can be adapted to compare the actual power to a rated power associated with machine 1050. Under retard, the rated power can be related to an ability of a mechanical and/or electrical component of machine 1050 to dissipate heat and/or transfer electrical energy without overheating. For example, if motor 1220 is an alternating current electric motor, the rated retard power can be limited by the windings of motor 1220, a component related to a speed controller associated with motor 1220, a grid box (e.g. a system which is used for dissipating power generated by a motor under retard), and/or an electrical wire transmitting power to motor 1220, etc. Information device 1400 can be adapted to determine a feedback metric related to the actual power and a rated power of at least one wheel drive of machine 1050.

System 1000 and/or machine 1050 can comprise a rolling resistance sensor 1320, which can be adapted to obtain and/or estimate a rolling resistance of machine 1050 interacting with a contact surface. The rolling resistance can be a measure of a frictional force between machine 1050 and the contact surface. Rolling resistance sensor 1320 can be adapted to measure one or more electrical signals of wheel drive system 1200 to determine a threshold value when rotational speed sensor 1200 detects a movement of a wheel of machine 1050. Rolling resistance sensor 1320 can be adapted to obtain information related to the contact surface and can comprise one or more proximity sensors adapted to identify obstructions present on the contact surface.

System 1000 can comprise a direction sensor 1340, which can be adapted to determine an actual translational direction of machine 1050. Direction sensor 1340 can be integral to and/or associated with translational sensor 1300. System 1000 can comprise a desired direction sensor 1460, which can be selected and/or determined by the operator of machine 1050. For example, desired direction sensor 1460 can detect that the operator has selected a forward gear and/or direction of travel for machine 1050.

Information device 1400 can be adapted to receive a speed measurement from a device such as rotational speed sensor 1240, and/or derive a speed measurement from a torque measurement provided by a device such as torque sensor 1260. Information device 1400 can calculate an acceleration associated with machine 1050, such as an angular and/or translational acceleration of machine 1050, via comparing a first translational or rotational speed measured at a first time to a second translational or rotational speed measured at a second time. Information device 1400 can be adapted to average accelerations of a plurality of wheel drives of machine 1050, average accelerations related to machine 1050 over a predetermined time period, and/or compare an acceleration of machine 1050 to a predetermined threshold. The predetermined threshold can be, for example, approximately 0.05 $m/s^2$, 0.1 $M/s^2$, 0.123 $m/s^2$, 0.2 $m/s^2$, 0.211 $m/s^2$, 0.43 $m/s^2$, 0.576 $m/s^2$, and/or any acceleration value above, below, or in between those values. Comparing the acceleration to a predetermined threshold can provide a signal adaptable to adjust a dynamic maximum torque associated with information device 1400.

Machine 1050 can comprise a retard setpoint sensor 1420. Retard setpoint sensor 1420 can be adapted to detect a measurement indicative of a retard setpoint. The retard setpoint can relate to a requested amount of retard from an operator of machine 1050. The retard setpoint can be proportional to a retard pedal depression by the operator of machine 1050. Retard setpoint sensor 1420 can be communicatively coupled to information device 1400. Information device 1400 can be adapted to compare the retard setpoint associated with retard setpoint sensor 1420 to a predetermined threshold.

Information device 1400 can be adapted to provide a maximum safe speed and/or a speed metric indicative of a maximum safe speed. Information device 1400 can be adapted to calculate and/or determine the maximum safe speed responsive to information obtained from inclinometer 1360 and/or weight sensor 1380. For example, when machine 1050, having a weight sensed by weight sensor 1380, traverses a downhill grade of a slope detected by inclinometer 1360, the maximum safe speed can represent a speed above which machine 1050 would be, or would be at risk of being, in an uncontrollable condition, such as when insufficient retard and/or braking power exists to slow the machine to a safe translational speed for a given incline. Information device 1400 can provide the maximum safe speed to wheel drive system 1200, which can be indicative of a speed below which wheel drive system 1200 should control and/or attempt to control machine 1050. Information device 1400 can provide a signal adapted to render the maximum safe speed on a user interface. The maximum safe speed can be dynamic and change with respect to load, location, incline, and/or machine weight.

Information device 1400 can be adapted to provide an output signal to a device related to motor 1220. The output signal from information device 1400 can be based on a proportional, integral, and/or derivative control algorithm in comparing at least one input signal to a value indicative of a setpoint. Information device 1400 can provide the output signal responsive to the feedback metric, the gradient provided by inclinometer 1360, the weight provided by weight sensor 1380, the actual retard torque provided by torque sensor 1260, and/or the retard torque limit, etc. A dynamic maximum torque can limit the signal indicative of the retard torque from information device 1400.

Applying a retard power to motor 1220 can restrain, and/or or attempt to restrain, an acceleration and/or speed of machine 1050. Information device 1400 can provide the output signal responsive to a feedback metric determined by information device 1400, gradient provided by inclinometer 1360, weight provided by weight sensor 1380, actual retard torque provided by torque sensor 1260, and/or retard torque limit, etc. A dynamic maximum power can limit the signal indicative of the retard power from information device 1400. The dynamic maximum power can be changed responsive to a signal from information device 1400.

The rotational speed of motor 1220 and/or velocity of machine 1050 corresponding to a dynamic maximum torque and/or power can depend on a gross machine weight (measurable utilizing weight sensor 1380) and/or an incline of a grade being traversed by the machine (measurable utilizing inclinometer 1360). Information device 1400 can cause the angular and/or translational speed of machine 1050 to be controlled.

In certain exemplary embodiments, a service brake controller 1420 can be comprised by information device 1400. Service brake controller 1420 can be adapted to, responsive to a determination that at least one wheel comprising a wheel motor is rotating in an undesired direction at a rotational speed that is above a predetermined rotational speed and a determination that machine 1050 is traveling in an opposing direction to a desired direction of travel at a translational velocity that is less than a threshold velocity, automatically set service brake 1280. Service brake controller 1425 can be adapted to, responsive to a determination that an actual propel torque of machine 1050 exceeds a threshold propel torque, automatically release service brake 1280 of machine 1050.

Information device 1400 can be adapted to obtain and/or determine the threshold propel torque. The threshold propel torque can be based upon gross vehicle weight, terrain incline, rolling resistance, machine tire radius, and/or one or more gear ratios associated with machine 1050.

In certain exemplary embodiments, information device 1400 can be adapted to automatically control translational velocity and/or a path of travel of machine 1050. Responsive to a determination that the machine should be moved, information device 1400 can be adapted to obtain path information from a Global Positioning System (GPS) and/or a Geographic Information System (GIS). Based upon the path information, information device 1400 can be adapted to determine a path for the machine to a predetermined destination. Information device 1400 can be adapted to determine and/or establish a target velocity and direction profile over the path and can provide signals to wheel drive system 1200 to cause motion of machine 1050 over the path according to the target velocity and direction profile.

Wheel drive system 1200 can be adapted to utilize service brake 1280 along with signals adapted to apply torque to motor 1220 in order to attempt to move machine 1050 according to the target velocity and direction profile. The torque can be a propel torque or a retard torque according to whether machine 1050 is moving at a translational velocity below, equal to, or in excess of the target velocity, according to whether machine 1050 is moving in a desired direction according to the direction profile, and/or according to predicted changes in energy associated with anticipated changes in the path and/or target velocity and direction profiles. For example, a retard torque might be applied in anticipation of machine 1050 crossing over a hill crest to a downhill grade even if a present velocity of the machine is less than or equal to a velocity associated with the target velocity profile.

Information device 1400 can be adapted to anticipate changes in the translational velocity of machine 1050 based upon upcoming terrain characteristics of the path, the grade of upcoming portions of the path, the weight of the machine, and/or a remaining distance in the path, etc. Information device 1400 can be adapted to cause machine 1050 to accelerate and decelerate according to an automatically determined profile. The automatically determined profile can be adapted to limit a maximum velocity, maximum acceleration, and/or maximum jerk of machine 1050 over the path. Information device 1400 can be adapted to employ adaptive learning and/or heuristic rules in order to improve conformance with the target velocity and direction profile over time.

Figure 2:
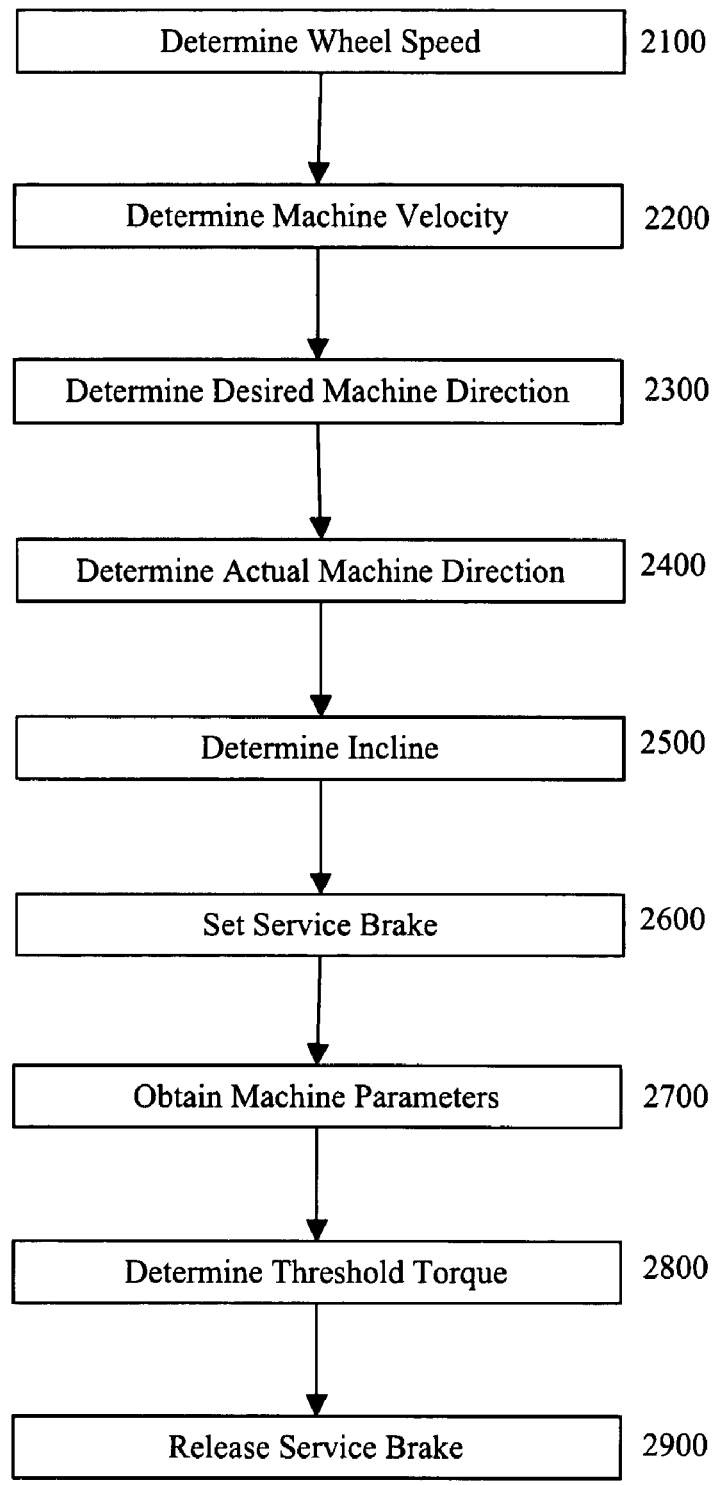
FIG. 2 is a flowchart of an exemplary embodiment of a method 2000.

FIG. 2 is a flowchart of an exemplary embodiment of a method 2000. At activity 2100, a wheel rotational speed of a wheel of a machine can be determined. In certain exemplary embodiments, the machine can be a mining haulage vehicle. The rotational speed of the wheel can be obtained via a rotational speed sensor.

At activity 2200, a translational velocity of the machine can be obtained and/or determined. The translational velocity of the machine can be obtained from a translational velocity sensor and/or can be determined based upon information from the rotational speed sensor of the wheel.

At activity 2300, a desired direction of travel of the machine can be obtained and/or determined. The desired direction of travel of the machine can be determined based upon an operator selection and/or a transmission shifter position.

At activity 2400, an actual direction of travel of the machine can be obtained and/or determined. The actual direction of travel can be compared to the desired direction of travel. Certain exemplary embodiments can be adapted to automatically determine that at least one wheel of the machine is rotating in an undesired direction. Certain exemplary embodiments can be adapted to automatically determine that the machine is traveling in an opposing direction to the desired direction of travel at a translational velocity that is less than a predetermined translational velocity threshold. The predetermined translational velocity threshold can be determined and/or selected in order to attempt to control wear of brake surfaces associated with the machine.

At activity 2500, an incline of the machine and/or a surface in contact with the machine can be obtained and/or determined.

At activity 2600, a service brake of the machine can be set. The service brake can be set responsive to the determination that at least one wheel comprising a wheel motor is rotating in the undesired direction at a rotational speed that is above a predetermined rotational speed threshold and/or the determination that the mining haulage vehicle is traveling in the opposing direction to the desired direction of travel at the translational velocity that is less than the predetermined translational velocity threshold.

At activity 2700, machine parameters can be monitored, determined and/or obtained. For example, machine parameters can comprise one or more of the following:
 a weight such as a gross vehicle weight;
 a gear ratio of one or more speed reducers associated with the machine and/or a wheel drive of the machine;
 a rolling resistance of the machine and a surface in contact therewith;
 a rolling radius of a tire of the machine; and/or
 a throttle position of the machine, etc.

At activity 2800, a threshold propel torque can be determined and/or obtained. The threshold propel torque can be a torque value expected to cause the machine to be propelled in the desired direction of travel. The threshold propel torque can be determined and/or obtained based upon the gross vehicle weight, the incline, the rolling resistance, the rolling radius, and/or the gear ratio, etc. of the machine. In certain exemplary embodiments, an actual propel torque can be automatically determined and/or estimated based upon the throttle position of the machine.

At activity 2900, the service brake can be released. The service brake can be automatically released responsive to a determination that the actual propel torque of the machine exceeds the threshold propel torque. In certain exemplary embodiments, the actual propel torque can be within a predetermined range above the threshold propel torque in order for the service brake to be automatically released, which can limit a jerk of the machine to a value less than a predetermined threshold value.

Figure 3:
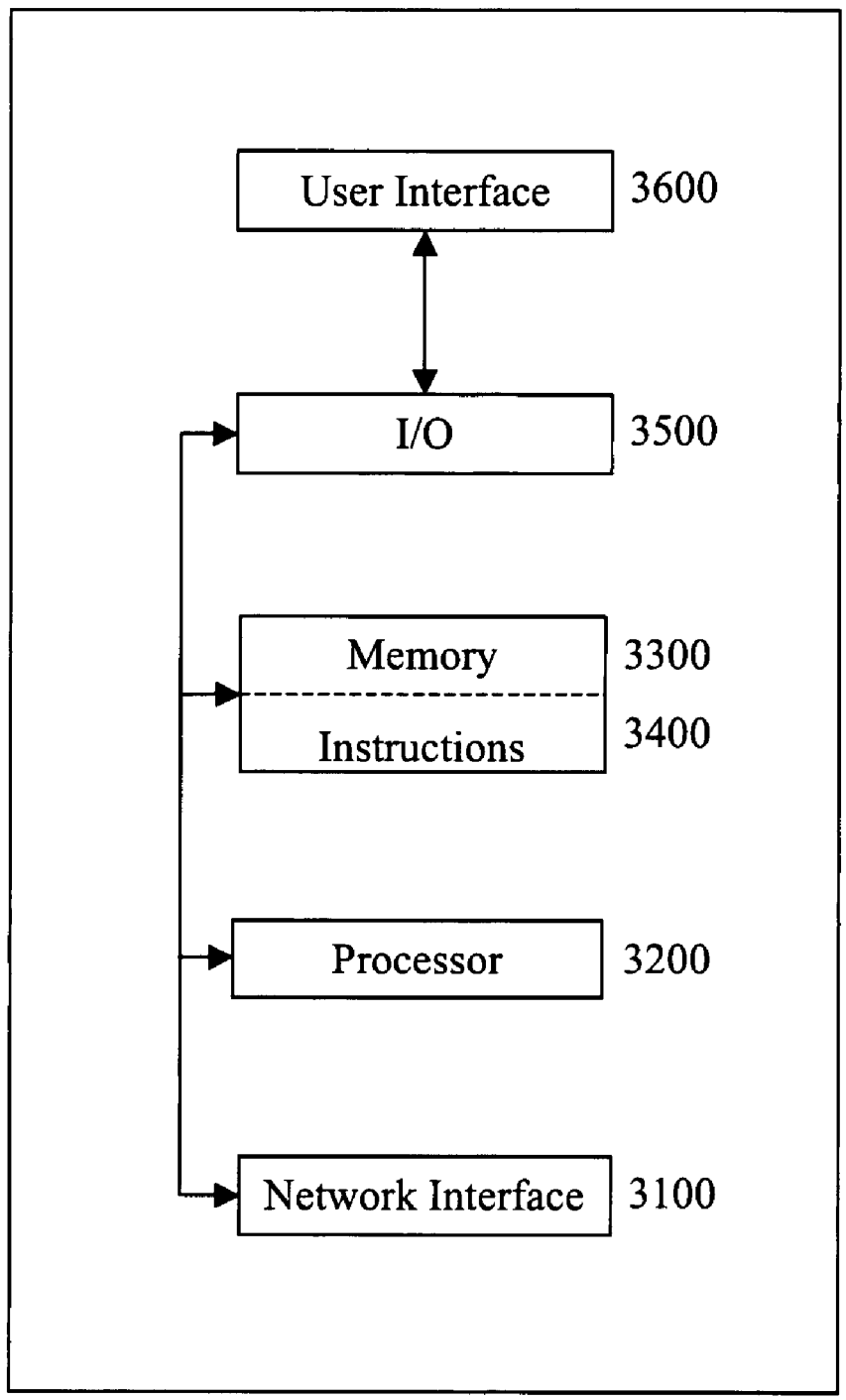
FIG. 3 is a block diagram of an exemplary embodiment of an information device 3000.

FIG. 3 is a block diagram of an exemplary embodiment of an information device 3000, which in certain operative embodiments can comprise, for example, information device 1400 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, performed by multiple entities, and/or performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method comprising a plurality of activities, comprising:
    for a mining haulage vehicle comprising a wheel drive system driven by an electric motor capable of applying a propel torque to at least one wheel coupled thereto, obtaining a rotational speed for each wheel;
    via an inclinometer, obtaining an incline of a terrain being traversed by said mining haulage vehicle;
    determining a desired velocity, including direction of travel, for said mining haulage vehicle;
    automatically determining that at least one wheel of said mining haulage vehicle is rotating in an undesired direction;
    automatically determining that said mining haulage vehicle is traveling in an opposing direction to said desired direction of travel at a translational velocity that is less than a predetermined translational velocity threshold;
    automatically setting a service brake of said mining haulage vehicle responsive to said determination that said at least one wheel comprising said wheel motor is rotating in said undesired direction at a rotational speed that is above a predetermined rotational speed threshold and said determination that said mining haulage vehicle is traveling in said opposing direction to said desired direction of travel at said translational velocity that is less than said predetermined translational velocity threshold;
    obtaining a gross vehicle weight for said mining haulage vehicle;
    obtaining a gear ratio associated with said mining haulage vehicle;
    estimating a rolling resistance of said mining haulage vehicle;
    obtaining a rolling radius of a tire of said mining haulage vehicle;
    automatically determining a threshold propel torque for said mining haulage vehicle, said threshold propel torque determined based upon said gross vehicle weight, said terrain incline, said rolling resistance, said rolling radius, and said gear ratio;
    automatically monitoring a throttle position of said mining haulage vehicle;
    automatically determining an actual propel torque for said mining haulage vehicle based upon said throttle position;
    automatically causing the electric motor to apply additional propel torque to the wheel in order to exceed the threshold propel torque; and
    automatically releasing said service brake responsive to a determination that said actual propel torque of said mining haulage vehicle exceeds said threshold propel torque.

2. A method comprising a plurality of activities, comprising:
    for a mining haulage vehicle comprising a wheel drive system driven by an electric motor capable of applying a selectively varying propel torque to at least one wheel coupled thereto, obtaining an actual propel torque for each wheel;
    determining a threshold torque necessary to cause the mining haulage vehicle to achieve a desired velocity, including direction of translation;
    automatically causing the electric motor to vary propel torque to the wheel in order to achieve the threshold propel torque;
    responsive to a determination that an actual propel torque of a mining haulage vehicle exceeds a threshold propel torque, automatically releasing a service brake of said mining haulage vehicle, said service brake automatically set responsive to a determination that a wheel comprising a wheel motor is rotating in an undesired direction at a rotational speed that is above a predetermined rotational speed threshold and a determination that said mining haulage vehicle is traveling in an opposing direction to a desired direction of travel at a translational velocity that is less than a predetermined translational velocity threshold.

3. The method of claim 2, further comprising:
    automatically determining said threshold propel torque for said mining haulage vehicle, said threshold propel torque determined based upon a gross vehicle weight, a terrain incline, a rolling resistance, a tire radius, and a gear ratio of said mining haulage vehicle.

4. The method of claim 2, further comprising:
automatically determining said actual propel torque based upon a throttle position of said mining haulage vehicle.

5. The method of claim 2, further comprising:
obtaining said rotational speed for said wheel of said mining haulage vehicle that comprises said wheel motor.

6. The method of claim 2, further comprising:
via an inclinometer, obtaining an incline of a terrain being traversed by said mining haulage vehicle, said threshold propel torque determined based upon said incline.

7. The method of claim 2, further comprising:
obtaining a gross vehicle weight for said mining haulage vehicle, said threshold propel torque determined based upon said gross vehicle weight.

8. The method of claim 2, further comprising:
determining said desired direction of travel for said mining haulage vehicle.

9. The method of claim 2, further comprising:
automatically determining that said wheel of said mining haulage vehicle is rotating in said undesired direction.

10. The method of claim 2, further comprising:
automatically determining that said mining haulage vehicle is traveling in said opposing direction at said translational velocity.

11. The method of claim 2, further comprising:
automatically monitoring a throttle position of said mining haulage vehicle, said actual propel torque determined based upon said throttle position.

12. The method of claim 2, further comprising:
obtaining a gear ratio associated with said mining haulage vehicle, said threshold propel torque determined based upon said gear ratio.

13. The method of claim 2, further comprising:
estimating a rolling resistance of said mining haulage vehicle, said threshold propel torque determined based upon said rolling resistance.

14. The method of claim 2, further comprising:
obtaining a rolling radius of a tire of said mining haulage vehicle, said threshold propel torque determined based upon said rolling radius.

15. The method of claim 2, further comprising:
automatically determining said threshold propel torque.

16. The method of claim 2, further comprising:
automatically setting said service brake of said mining haulage vehicle.

17. A method comprising a plurality of activities, comprising:
for a mining haulage vehicle comprising a wheel drive system driven by an electric motor capable of applying a selectively varying propel or retard torque to at least one wheel coupled thereto, obtaining an actual propel torque for each wheel;
determining a threshold torque necessary to cause the mining haulage vehicle to achieve a desired velocity, including direction of translation;
automatically causing the electric motor to vary propel or retard torque to the wheel in order to achieve the threshold propel torque;
responsive to a determination that said mining haulage vehicle is traveling in an opposing direction to a desired direction of travel or at a translational velocity exceeding the desired velocity automatically applying a service brake, said service brake adapted to be automatically released responsive to a determination that an actual propel torque of a mining haulage vehicle exceeds the threshold propel torque.

18. The method of claim 17, further comprising:
automatically determining said threshold propel torque for said mining haulage vehicle, said threshold propel torque determined based upon a gross vehicle weight, a terrain incline, a rolling resistance, a tire radius, and a gear ratio of said mining haulage vehicle.

19. A system comprising:
a mining haulage vehicle having a wheel drive system driven by an electric motor capable of applying a selectively varying propel torque to at least one wheel coupled thereto, and a sensor for obtaining an actual propel torque for each wheel;
an information device coupled to the propel torque sensor and the wheel drive system, capable of determining a threshold torque necessary to cause the mining haulage vehicle to achieve a desired velocity, including direction of translation and automatically causing the electric motor to vary propel torque to the wheel in order to achieve the threshold propel torque; and
a service brake controller coupled to the information device adapted to, responsive to a determination that the actual propel torque of a mining haulage vehicle exceeds the threshold propel torque, automatically release a service brake of said mining haulage vehicle, said service brake automatically set responsive to a determination that at least one wheel comprising a wheel drive system is rotating in an undesired direction at a rotational speed that is above a predetermined rotational speed threshold and a determination that said mining haulage vehicle is traveling in an opposing direction to a desired direction of travel at a translational velocity that is less than a predetermined translational velocity threshold.

20. A machine-readable medium comprising stored instructions adapted for use in a system including a mining haulage vehicle having:
a wheel drive system driven by an electric motor capable of applying a selectively varying propel torque to at least one wheel coupled thereto,
a sensor for obtaining an actual propel torque for each wheel,
a service brake for braking the haulage vehicle; and
an information device coupled to the propel torque sensor, the wheel drive system and the service brake, the information device having a processor with memory capable of storing and executing said instructions, and during execution of said instructions:
determining a threshold torque necessary to cause the mining haulage vehicle to achieve a desired velocity, including direction of translation and automatically causing the electric motor to vary propel torque to the wheel in order to cause the actual propel torque to achieve the threshold propel torque; and
responsive to a determination that the actual propel torque of the mining haulage vehicle exceeds the threshold propel torque, automatically releasing the service brake, said service brake automatically set responsive to a determination that at least one wheel comprising wheel drive system is rotating in an undesired direction at a rotational speed that is above a predetermined rotational speed threshold and a determination that said mining haulage vehicle is traveling in an opposing direction to a desired direction of travel at a translational velocity that is less than a predetermined translational velocity threshold.

* * * * *